United States Patent
Damiani et al.

(10) Patent No.: US 7,491,150 B2
(45) Date of Patent: Feb. 17, 2009

(54) ROBOTIZED GEAR CHANGE FOR MOTOR VEHICLES

(75) Inventors: Sergio Damiani, Orbassano (IT); Gianfranco Burzio, Orbassano (IT); Silvia Quattrocolo, Orbassano (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 377 days.

(21) Appl. No.: 11/493,377

(22) Filed: Jul. 26, 2006

(65) Prior Publication Data
US 2007/0032338 A1 Feb. 8, 2007

(30) Foreign Application Priority Data
Jul. 27, 2005 (EP) ................... 05425551

(51) Int. Cl.
*F16D 48/06* (2006.01)
(52) U.S. Cl. ................... 477/74
(58) Field of Classification Search ............ 74/335
See application file for complete search history.

(56) References Cited

U.S. PATENT DOCUMENTS

| | | | | |
|---|---|---|---|---|
| 5,335,743 A | | 8/1994 | Gillbrand et al. ............ 180/178 |
| 6,065,360 A | * | 5/2000 | Hollingsworth et al. ....... 74/335 |
| 6,076,414 A | * | 6/2000 | Tabata et al. ................. 74/335 |
| 6,676,562 B1 | * | 1/2004 | Bulgrien ....................... 477/74 |
| 7,079,933 B2 | * | 7/2006 | Kano et al. ................... 701/67 |

FOREIGN PATENT DOCUMENTS

| | | |
|---|---|---|
| DE | 39 41 665 A1 | 6/1991 |
| DE | 42 33 938 A1 | 4/1994 |
| DE | 196 41 706 C1 | 3/1998 |
| DE | 197 54 247 A1 | 6/1998 |

* cited by examiner

*Primary Examiner*—Dirk Wright
(74) *Attorney, Agent, or Firm*—Seed IP Law Group PLLC

(57) ABSTRACT

A robotized gear change for motor vehicles, and in particular motor vehicles for disabled persons, configured for implementing a plurality of operating modes that can be selected by the driver via a manually operable hand or foot selection device, in which first operating modes associated with the automatic gear-change mode can be selected when the vehicle is stationary and a brake pedal is depressed, and in second operating modes corresponding to the level of performance of the engine, and hence the vehicle, can be selected by the driver when the vehicle is moving.

17 Claims, 3 Drawing Sheets

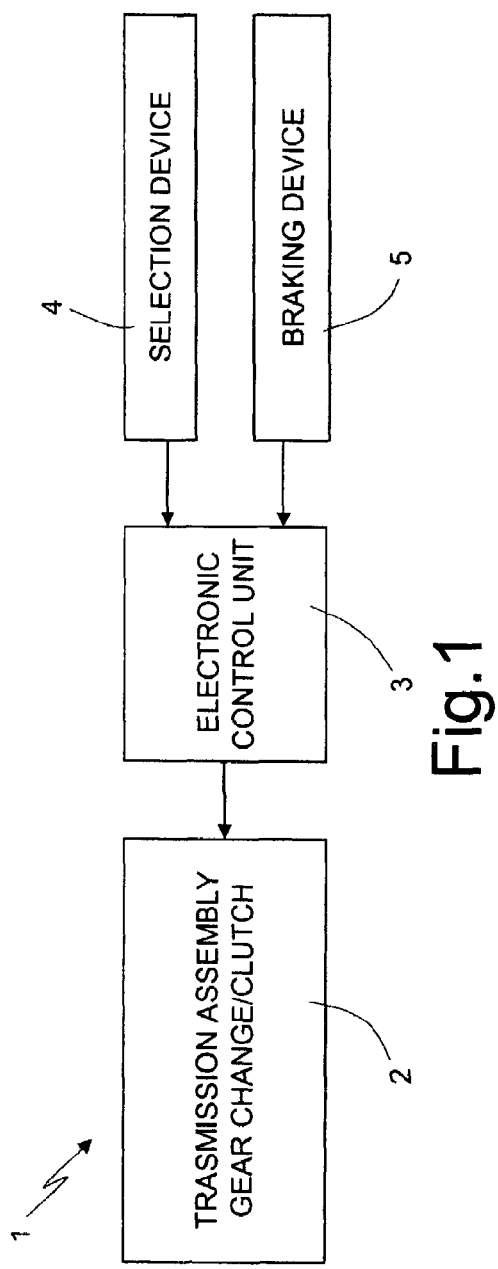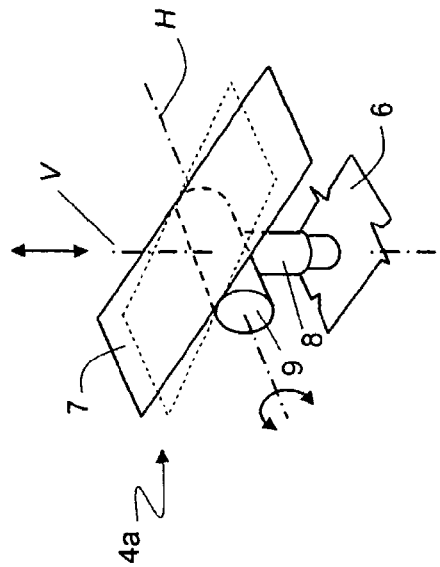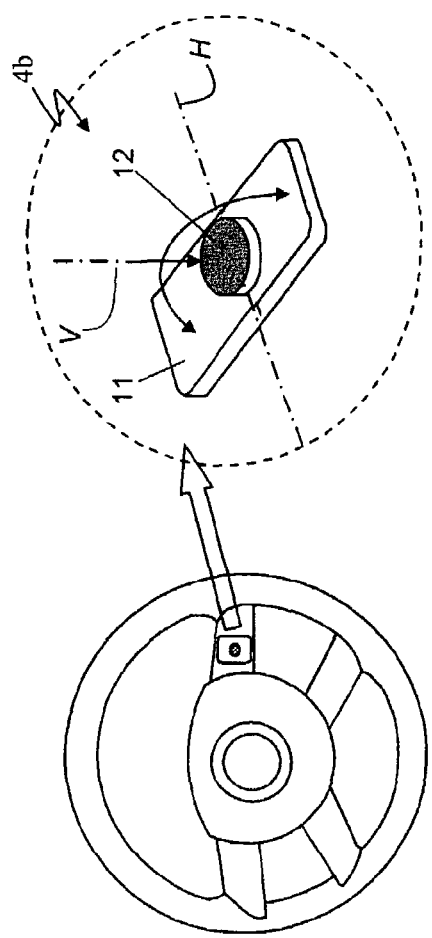

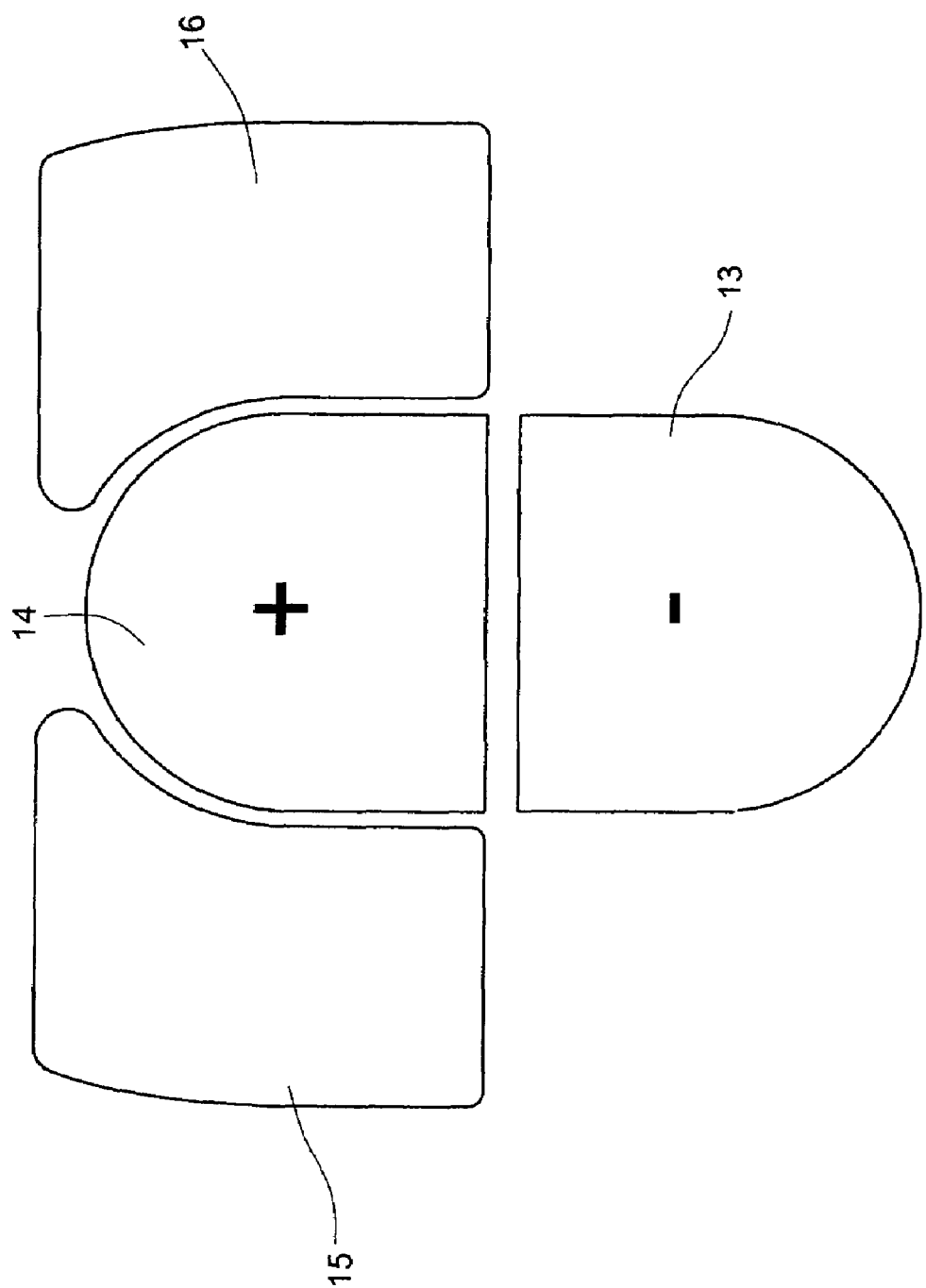

ROBOTIZED GEAR CHANGE FOR MOTOR VEHICLES

BACKGROUND OF THE INVENTION

1. Field of the Invention

The present invention relates to a robotized gear change for motor vehicles and, in particular, motor vehicles for disabled persons.

2. Description of the Related Art

As is known, in motor vehicles for disabled persons the main controls of the vehicle, and in particular the steering, the gear lever, and the pedals of the clutch, brake, and accelerator, can be partially or totally replaced by auxiliary controls, which are chosen on the basis of the type of handicap of the driver in order to enable persons with a seriously limited use of his or her limbs to drive the vehicle.

In particular, amongst the different possible auxiliary controls for vehicles for disabled persons may be listed:

the combined accelerator-brake levers, which replace both the brake pedal and the accelerator pedal and enable paraplegic persons (i.e., persons who are unable to use their lower limbs or can use them only to a limited extent) to carry out operations of acceleration and braking of the vehicle using their hands;

the joysticks and pedals for control of the steering, which replace the traditional steering wheel and enable disabled persons who can use their upper limbs only to a limited extent to carry out operations of steering of the vehicle;

the steering control knobs, for controlling steering with just one hand, for disabled persons who can use only one upper limb; and the wireless-communication control units or the like, that enable a user to handle all the auxiliary controls with which the vehicle is equipped without taking his hands off the steering wheel.

As regards the gear change of the vehicle, it is known in the majority of cases persons with handicaps to their lower and/or upper limbs are unable to use gears of a manual type, which always require the use both of at least one arm and of one leg. For this reason, the majority of vehicles for disabled persons are provided with an automatic gear change of a traditional type that does not require either the clutch pedal or the manual gear lever.

BRIEF SUMMARY OF THE INVENTION

The disclosed embodiments of the present invention provide a robotized gear change for vehicles that will be simple to maneuver and will improve the driving comfort for disabled persons.

According to one aspect of the invention, a robotized gear change for vehicles, in particular vehicles for disabled persons, including a gear change coupled in a releasable way to the engine of the vehicle through a clutch is provided, the gear change and the clutch are provided with respective actuators for controlling engagement and disengagement of the gears, and, respectively, release and engagement of the clutch. There is an electronic control unit configured for controlling the actuators for implementing a plurality of operating modes of the robotized gear change, the operating modes including an automatic gear-change mode, in which release and engagement of the clutch and selection and engagement and disengagement of the gears are governed in a completely automatic way by the electronic control unit, and a semiautomatic gear-change mode in which release and engagement of the clutch and engagement and disengagement of the gears are governed in a completely automatic way by the electronic control unit, whilst selection of the gears is performed by the driver of the vehicle. And there is a selector or selectors for selection of the operating modes of the robotized gear change and of the gears, which can be operated by the driver. The electronic control unit is configured for enabling the driver, through the selector, to select first operating modes associated with the automatic gear-change mode, when the vehicle is stationary and a brake pedal is depressed, and second operating modes corresponding to the level of performance of the engine and the vehicle desired by the driver when the vehicle is moving.

According to another aspect of the invention, the selectors are configured for generating first control signals in response to a rotary movement between a resting position and a first selection position, and second control signals in response to a translational movement between a resting position and a second selection position, the electronic control unit being moreover configured for controlling the first and second actuator means on the basis of the first and second control signals.

According to yet another aspect of the invention, the selectors are linearly mobile along a first axis and angularly mobile about a second axis transverse to the first.

According to another aspect of the invention, the selectors include at least one element on which the driver can rest a foot, the resting element linearly mobile along the first axis and also angularly mobile to rotate about the second axis.

According to another aspect of the invention, the selectors are of a manually operable type.

According to a further aspect of the invention, the selectors include at least one element that can move about the second axis between the resting position and the first selection position.

According to another aspect of the invention, the element carries a push-button that can move along the first axis between the resting position and the second selection position.

According to another aspect of the invention, the selectors are formed by a plurality of distinct push-button elements operable by the driver manually, by hand or by foot.

According to another aspect of the invention, the operating modes include a first mode to enable movement of the vehicle; a second mode to enable release of the clutch of the vehicle; a third mode to maintain the vehicle stationary and with the brakes on; a fourth mode to enable selection and, respectively, engagement and disengagement of the reverse gear; a fifth mode configured for reducing to a minimum fuel consumption of the vehicle; and a sixth mode configured to enhance the levels of performance of the vehicle.

According to another aspect of the invention, the operating modes are selected by moving the selector angularly about the second axis in a first direction so as to reach the first selection position.

According to another aspect of the invention, the operating modes are selected by moving the selector angularly about the second axis in a second direction opposite to the first direction to reach the first selection position.

According to another aspect of the invention, the operating modes are selected by moving the selector linearly along the first axis to reach the second selection position.

According to another aspect of the invention, the first, second, third and fourth operating modes are selected by moving the selector linearly along the first axis to reach the second selection position when the vehicle is stationary.

According to another aspect of the invention, the first, second, third and fourth operating modes are selected by moving the selector angularly about the second axis to reach the first selection position when the vehicle is stationary.

According to another aspect of the invention, the fifth, sixth, seventh and eighth operating modes are selected when the first operating mode has been previously selected.

According to another aspect of the invention, the fifth, sixth, seventh and eighth operating modes are selected by moving the selector linearly along the first axis to reach the second selection position when the vehicle is moving.

According to another aspect of the invention, the fifth, sixth, seventh and eighth operating modes are selected by moving the selector angularly about the second axis to reach the first selection position when the vehicle is moving.

BRIEF DESCRIPTION OF THE SEVERAL VIEWS OF THE DRAWINGS

For a better understanding of the present invention, two preferred embodiments are now described, purely by way of non-limiting example, with reference to the attached drawings, wherein:

FIG. 1 shows a block diagram of a robotized gear change according to the invention;

FIG. 2 shows an embodiment of a device for selection of operating modes of the robotized gear change according to the invention;

FIG. 3 shows a different embodiment of the selection device of FIG. 2;

FIG. 4 illustrates an example of application of the selection device of FIG. 3;

FIG. 6 illustrates a further embodiment of the selection device of FIG. 2.

DETAILED DESCRIPTION OF THE INVENTION

Figure 5:
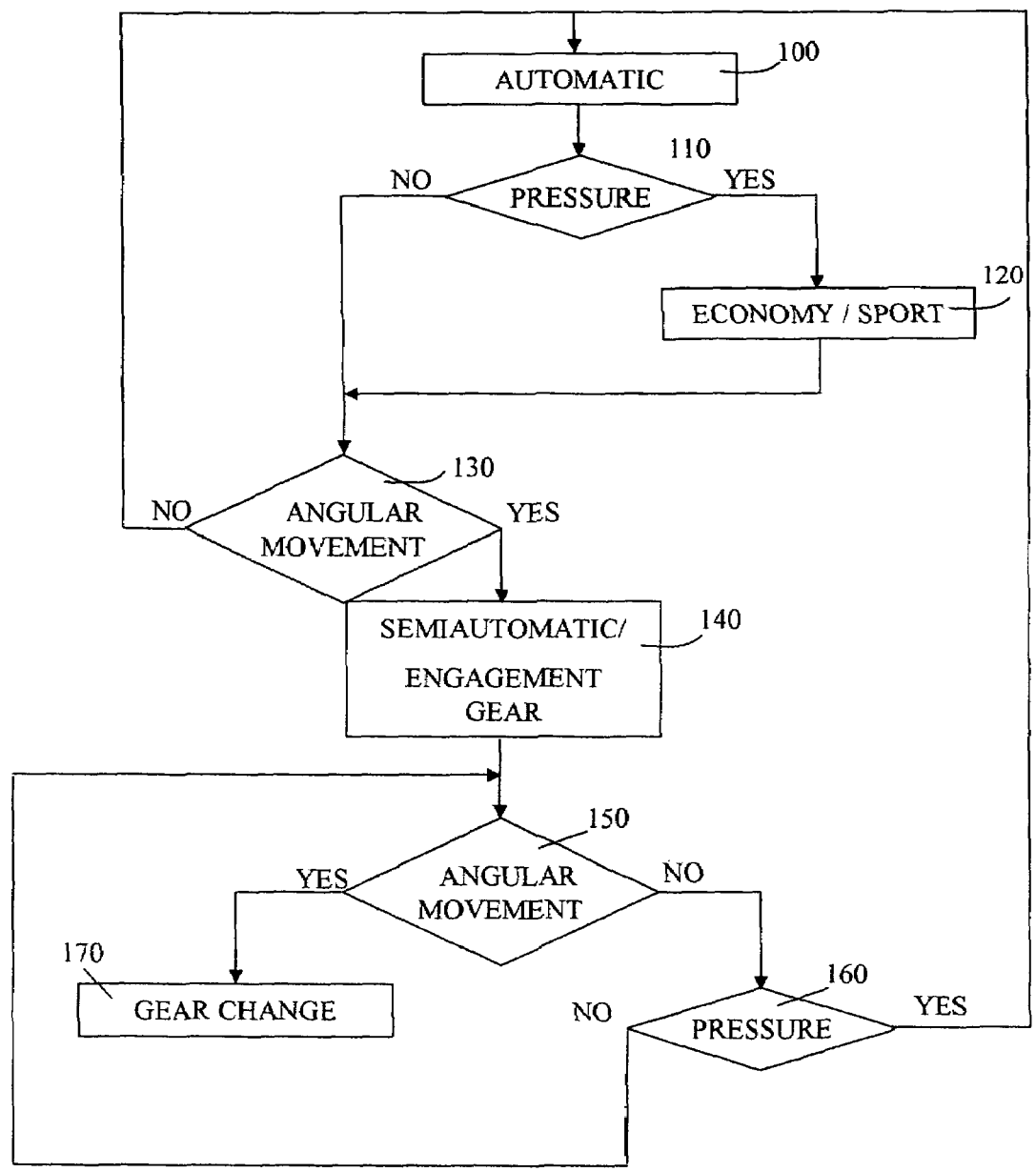
FIG. 5 illustrates a flowchart corresponding to operation of the robotized gear change.

Designated by reference number 1 in FIG. 1 is a robotized gear change according to the invention that includes a transmission assembly 2 of a known type, which in turn includes the following known elements not represented in the figure:

a gear change;

a clutch, having the purpose of coupling in a releasable way the gear change to the vehicle engine;

a first actuator coupled to the clutch for controlling actuation thereof for release and engagement thereof; and second and third actuators coupled to the gear change for controlling selection and, respectively, engagement/disengagement of the gears.

The above transmission assembly 2 is governed by an electronic control unit 3, which generates at output control signals for the aforesaid actuator means for actuation of the clutch and selection and engagement/disengagement of the gears.

In particular the aforesaid control signals for the actuators are generated by the electronic control unit 3 as a function of:

first signals coming from sensors (not illustrated) coupled to a mobile selection device 4, by means of which the driver can choose between different modes of operation of the robotized gear change 1; and second signals coming from sensors (not illustrated) coupled to a braking device of the vehicle that can be operated by the driver of the vehicle, for example a brake pedal 5.

In the case in point, as shown in FIG. 2, the mobile selection device 4 can be provided in the form of a pedal, hereinafter referred to as selection pedal 4a, so as enable operation by disabled persons with a limited use of their upper limbs via simple movements of the foot.

Alternatively, as shown in FIG. 3, the mobile selection device 4 can be provided in the manually operable form 4b so as to enable operation by disabled persons with a limited use of their lower limbs via simple movements of the hands. In this case, the selection device 4b may, for example, be mounted directly on the steering wheel of the vehicle as illustrated in FIG. 4.

In particular, the selection pedal 4a comprises a mobile element 7 for having a plane rectangular shape on which the driver can rest his foot, a connection device 8 extending from a supporting base 6 along an axis V, and an angular connection device 9 set between one end of the connection device 8 and the element 7 to enable an angular movement of the latter about an axis H transverse to the axis V.

In particular, the element 7 is angularly mobile about the axis H between a stable central resting position (represented by the solid line) and a first unstable selection position and a second unstable selection position (one of which is represented in FIG. 2 with a dashed line), which are set on opposite sides of the resting position and can be reached starting from the central resting position by rotation or rocking of the element 7 to tilt or angularly move the element 7 in opposite directions.

The element 7 is moreover linearly mobile along the axis V between the resting position referred to above (consequently representing also the top, stable, resting position) and a bottom, unstable, selection position (not illustrated in FIG. 2).

The resting and selection positions of the element 7 are monitored by respective sensors (not illustrated) to generate respective signals sent to the electronic control unit 3 in order to govern the transmission assembly 2 according to the modalities that will be clarified hereinafter.

The angular connection device 9 and the connection device 8 comprise elastic elements (not shown in the figure) designed to bring back the element 7 from the unstable selection position to the resting position whenever the action of selection by the driver ceases.

In the embodiment illustrated in FIG. 3, the manually operable selection device 4b comprises an element 11 of a substantially rectangular shape, which is set in a seat (not illustrated) provided on one spoke of the steering wheel, and is mobile, in a way similar to the element 7, about a central axis H between a stable central resting position and a first unstable selection position and a second unstable selection position, which are set on opposite sides of the resting position and can be reached starting from the central resting position by rotation or rocking of the element 11 to tilt or move angularly in opposite directions.

The angular position of the element 11 is monitored by respective sensors (not illustrated) to generate electrical signals for the electronic control unit 3. The angular position of the element 11 is regulated by means of a manual action thereon; it is consequently clear how the element 11 performs the same function as the element 7 illustrated in FIG. 2.

The element 11 carries a selection push-button 12, which is set in a central portion thereof and is also manually operable. In particular, the selection push-button 12 is linearly mobile along an axis V between a top, stable, resting position and a bottom, unstable, selection position to generate respective signals supplied to the electronic control unit 3. Also in this case, the function of the push-button 12 is altogether similar to that of the element 7 when said push-button 12 moves along the axis V.

The selection device 4 can even be provided with just one element (not illustrated) configured both for being linearly mobile along an axis V between a top, stable, resting position and a bottom, unstable, selection position, in order to be angularly mobile about an axis H between a first unstable selection position and a second stable resting position.

As mentioned previously, the robotized gear change 1 is configured to operate with the selection pedal 4a or else in the manually operable form 4b.

The driver of the vehicle consequently operates the selection pedal 4a or the selection device 4b in order to select different operating modes of the transmission assembly 2.

The aforesaid operating modes of the robotized gear change 1 can be displayed on a display installed on board the vehicle.

In particular, the operating modes of the robotized gear change 1 can comprise:

a driving mode "DRIVE", designed to enable the actuator means coupled to the clutch and the actuator means coupled to the gear change to control in an automatic way selection and, respectively, engagement/disengagement of the gears at starting of the vehicle and while the vehicle is traveling;

a neutral mode "NEUTRAL", designed to provide release of the clutch of the vehicle;

a parking mode "PARKING", designed to keep the vehicle stationary and in a braked condition; and a reverse mode "REVERSE", designed to enable the actuator means coupled to the clutch and the actuator means coupled to the gear change to control selection and, respectively, engagement and disengagement of the reverse gear.

In a preferred embodiment of the invention, the "PARKING" mode is set automatically to key-on, whilst the other operating modes listed above can be selected by pressing either the element 7 or the element 11 with just the brake pedal 5 pressed.

Furthermore, in the case where the "DRIVE" operating mode is selected, the robotized gear change 1 envisages the possibility of selecting the following two gear-change modes:

an automatic gear-change mode, in which both the clutch and the engagement and disengagement of the gears are actuated in a completely automatic way by the robotized gear change 1 and in which the driver of the vehicle simply acts on the controls for acceleration or braking of the vehicle; and a semiautomatic gear-change mode, in which the clutch is again actuated automatically by the robotized gear change 1 but in which the gears are selected and engaged or disengaged by the driver of the vehicle by acting on the selection pedal 4a or on the selection device 4b.

In a preferred embodiment of the invention, the automatic gear-change mode is set automatically to key-on, whilst passage to the semiautomatic gear-change mode can be controlled by the driver by a rotation or angular movement of the element 7 or of the element 11 in one direction or the other. In particular, rotation of the element 7 or the element 11 about the axis H in one direction determines selection and engagement of the next gear higher than the currently engaged one (upshift), whilst rotation of the element 7 or the element 11 about the axis H in the opposite direction determines selection and engagement of the previous gear lower than the currently engaged one (downshift). Return to the automatic gear-change mode can be controlled by the driver by simply pressing the element 7 or the element 11 to move along the V axis.

Furthermore, both in the automatic gear-change mode and in the semiautomatic gear-change mode, the following driving modes are envisaged:

an "ECONOMY" mode, configured for reducing the levels of consumption of the engine and obtaining a more comfortable driving style; and a "SPORT" mode configured for enhancing the levels of performance of the engine and hence the vehicle and obtaining a more sporting style of driving.

n a preferred embodiment of the invention, selection of the driving modes listed above can be performed by the driver only in the automatic gear-change mode, by simply pressing the element 7 or the element 11 to move along the V axis.

Operation of the robotized gear change 1 is described in what follows.

At key-on, the electronic control unit 3 automatically sets the automatic gear-change mode, the "PARKING" operating mode, and the driving mode ("ECONOMY" or "SPORT") that was set before the engine was turned off at the end of the previous trip of the motor vehicle, said driving mode being kept stored in memory by the electronic control unit 3 when the engine was turned off, until a new driving mode is selected. Alternatively, the electronic control unit 3 could automatically set the "ECONOMY" driving mode.

The on-board display displays the current operating modes at vehicle starting so as to provide the driver with an indication of the operations to be performed for selecting the desired modes.

By keeping the brake pedal 5 pressed, the driver has the possibility of selecting one of the different operating modes of the robotized gear change 1, for example, "DRIVE", "NEUTRAL", "REVERSE" (or "PARKING" if one of the other operating modes had previously been selected), by acting on the selection pedal 4a or on the selection device 4b until the desired operating mode is selected.

Said action can be performed, for example, by pressing in succession the mobile element 7 on which the foot rests to move it along the V axis a number of times from the top, resting, position to the bottom, selection, position. Alternatively, said action can be performed by rotating about the H axis in succession the mobile element 7 on which the foot rests to bring it a number of times from the resting position to the activation position.

In a similar way, the various operating modes of the robotized gear change 1 "DRIVE", "NEUTRAL", "REVERSE" and "PARKING" can be selected by pressing in succession the selection push-button 12 or, alternatively, by rotating in succession the element 11 to bring it a number of times from the resting position to the selection position.

The operating modes selected will be displayed on the on-board display.

In the case where the driver selects the "DRIVE" operating mode, the vehicle is set in motion as soon as the driver releases the brake pedal 5 and presses the accelerator pedal. When the vehicle is traveling, the robotized gear change 1 actuates the clutch, selects and engages or disengages the gears automatically according to the engine r.p.m. and of the power required. It is clear that when the vehicle is moving, i.e., once the "DRIVE" mode has been selected, it is not possible to pass from this operating mode to the operating modes "NEUTRAL", "REVERSE" or "PARKING".

To select one of these operating modes it is necessary, in fact, for the driver to stop the vehicle and keep the brake pedal 5 depressed. Only then, by acting once again on the selection device 4a or on the selection device 4b, will it be possible to select a new operating mode of the robotized gear change 1.

As illustrated in FIG. 5, when the vehicle is moving and the robotized gear change 1 is in the automatic gear-change mode, the driver is able to select one of the two driving modes "ECONOMY" or "SPORT", which remains selected even in the case where the driver passes to the semiautomatic gear-change mode simply by acting on the selection pedal 4a or on the selection device 4b.

For this purpose, the robotized gear change 1 is configured in such a way that, starting from the automatic gear-change mode (block 100) to a first actuation of the selection device 4, for example, a pressure of the element 7 or of the selection push-button 12 by the driver (block 110) corresponds to selection of one between the driving modes "ECONOMY" or "SPORT" (block 120); whereas, a second actuation (in particular an angular displacement) of the element 7 or of the element 11 (output YES from block 130) corresponds to passage from the automatic gear-change mode to the semiautomatic gear-change mode (block 140) and engagement of the next gear higher than the currently engaged one (upshift).

In particular, the robotized gear change 1 is configured in such a way that, once the semiautomatic gear-change mode has been selected, in order to select and engage or disengage the gears it will be sufficient to actuate once again, for example by angular displacement, the element 7 or the element 11 (block 150).

As illustrated in FIG. 5, selection of one of the two driving modes "ECONOMY" or "SPORT" can occur only when the robotized gear change 1 is in the automatic gear-change mode.

When the gear change is in the semiautomatic gear-change mode (block 140), in fact, a first actuation of the element 7 or of the element 11 (in particular, an angular displacement) is aimed at selection and engagement or disengagement of the gears (block 170), and hence, for safety reasons, necessarily associated with a second actuation of the element 7 or of the element 11 (in particular, a pressure—block 160) is a return from the semiautomatic gear-change mode to the automatic gear-change mode.

Once again with reference to FIG. 5, to enable selection of one of the two driving operating modes "ECONOMY" or "SPORT" starting from the semiautomatic mode (block 140), the driver must then press the element 7 or the element 11 twice, namely, the first time to pass from the semiautomatic gear-change mode to the automatic one (output YES from block 160), and the second time to select one between the modes "ECONOMY" and "SPORT" (output YES from block 110).

It is also clear how the robotized gear change 1 can be configured in such a way as to include further operating modes in addition to the ones described, which may always be activated by the driver via the selection device 4 in the way illustrated above.

It is moreover clear how the robotized gear change 1 can be used also on normal production vehicles for non-disabled persons.

The robotized gear change of the present invention presents the advantage of being simple to maneuver and of allowing disabled persons to achieve a greater driving comfort.

It further presents the major advantage of enabling total elimination of the gear lever, with which both vehicles provided with a manual gear change and those provided with an automatic gear change are normally equipped, in so far as all the operations of selection of the various modes of operation of the gear change are performed using the selection device 4.

Finally, it is clear that modifications and variations can be made to the robotized gear change described and illustrated herein without thereby departing from the sphere of protection of the present invention, as defined in the annexed claims.

For example, selection and engagement of a gear that is higher or lower than the currently engaged one, as well as selection of the various operating and driving modes, can be obtained by means of a selection device 4 formed by distinct push-button elements, which can be either manually operable of foot-operable.

By way of non-limiting example, FIG. 6 shows a selection device 4 formed by distinct foot-operable push-button elements that can be operated by the driver. In particular, a first push-button element 14, identified by the sign "+", and a second push-button element 13, identified by the sign "−", can be envisaged for enabling upshift and downshift, respectively, of the gears, a third push-button element 15 can be envisaged for selecting, when the vehicle is stationary and the brake pedal 5 is depressed, the operating modes "DRIVE", "NEUTRAL", "REVERSE", and "PARKING", whilst a fourth push-button element 16 can be envisaged for selecting, when the vehicle is moving, the driving modes "ECONOMY" and "SPORT". The latter push-button element could also be used to pass from the semiautomatic gear-change mode to the automatic gear-change mode, envisaging the further selection "AUTOMATIC".

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A robotized gear change for vehicles, in particular vehicles for disabled persons, comprising:

a gear change coupled in a releasable way to the engine of the vehicle through a clutch, said gear change and said clutch provided with respective actuator means for controlling engagement and disengagement of the gears, and, respectively, release and engagement of the clutch;

an electronic control unit configured for controlling said actuator means for implementing a plurality of operating modes of the robotized gear change, said operating modes comprising an automatic gear-change mode, in which release and engagement of the clutch and selection and engagement and disengagement of the gears are governed in a completely automatic way by the electronic control unit, and a semiautomatic gear-change mode in which release and engagement of the clutch and engagement and disengagement of the gears are governed in a completely automatic way by the electronic control unit, whilst selection of the gears is performed by the driver of the vehicle; and means for selection of the operating modes of the robotized gear change and of the gears, which can be operated by the driver;

said electronic control unit configured for enabling the driver, through said selection means, to select first operating modes associated with the automatic gear-change mode, when the vehicle is stationary and a brake pedal is depressed, and second operating modes corresponding to the level of performance of the engine desired by the driver when the vehicle is moving.

2. The robotized gear change of claim 1, in which said selection means are configured for generating first control signals in response to a rotary movement between a resting position and a first selection position, and second control signals in response to a translational movement between a resting position and a second selection position, said electronic control unit being moreover configured for controlling said first and second actuator means on the basis of said first and second control signals.

3. The robotized gear change of claim 2, in which said selection means are linearly mobile along a first axis, and angularly mobile about a second axis transverse to the first.

4. The robotized gear change of claim 3, in which said selection means comprise at least one element on which the driver can rest a foot, said resting element linearly mobile along said first axis and also angularly mobile to rotate about said second axis.

5. The robotized gear change of claim 3, in which said selection means are of a manually operable type.

6. The robotized gear change of claim 5, in which said selection means comprise at least one element that can move about said second axis between said resting position and said first selection position.

7. The robotized gear change of claim 6, in which said element carries a push-button that can move along said first axis between said resting position and said second selection position.

8. The robotized gear change of claim 1, in which said selection means are formed by a plurality of distinct push-button elements operable by the driver manually by hand or by foot.

9. The robotized gear change of claim 1, in which said operating modes comprise:
a first mode to enable movement of the vehicle;
a second mode to enable release of the clutch of the vehicle;
a third mode to maintain the vehicle stationary and with the brakes on;
a fourth mode to enable selection and, respectively, engagement and disengagement of the reverse gear;
a fifth mode configured for reducing to a minimum fuel consumption of said vehicle; and
a sixth mode configured to enhance the levels of performance of the vehicle.

10. The robotized gear change of claim 9, in which said operating modes are selected by moving said selection means angularly about said second axis in a first direction so as to reach said first selection position.

11. The robotized gear change of claim 9, in which said operating modes are selected by moving said selection means angularly about said second axis in a second direction opposite to said first direction to reach said first selection position.

12. The robotized gear change of claim 9, in which said operating modes are selected by moving said selection means linearly along said first axis to reach said second selection position.

13. The robotized gear change of claim 9, in which said first, second, third and fourth operating modes are selected by moving said selection means linearly along said first axis to reach said second selection position when the vehicle is stationary.

14. The robotized gear change of claim 9, in which said first, second, third and fourth operating modes are selected by moving said selection means angularly about said second axis to reach said first selection position when the vehicle is stationary.

15. The robotized gear change of claim 9, in which said fifth, sixth, seventh and eighth operating modes are selected when said first operating mode has been previously selected.

16. The robotized gear change of claim 9, in which said fifth, sixth, seventh and eighth operating modes are selected by moving said selection means linearly along said first axis to reach said second selection position when the vehicle is moving.

17. The robotized gear change of claim 9, in which said fifth, sixth, seventh and eighth operating modes are selected by moving said selection means angularly about said second axis to reach said first selection position when the vehicle is moving.

* * * * *